United States Patent Office 2,794,722
Patented June 4, 1957

2,794,722

FUEL ANTIKNOCK

John D. Bartleson, Franklin, Mich., assignor to Ethyl Corporation, New York, N. Y., a corporation of Delaware No Drawing. Application August 13, 1953,
Serial No. 374,157

12 Claims. (Cl. 44—69)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage particularly during storage, handling, and blending operations, namely, their inherent instability. Thus, tetraethyllead and related compounds are susceptible of deterioration which is largely dependent upon the nature of the environment. For example, it has been found that organolead antiknock agents and antiknock fluids containing the same, when in contact with certain metals, such as copper and copper-containing alloys, tend to deteriorate, even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such antiknock agents is contact with air. It is generally believed that atmospheric constitutents, notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult, if not impossible. Organolead antiknock agents are likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing compositions to any or all of the above environments results in a number of operational difficulties, including loss of antiknock effectiveness, the formation of sludge and other types of sediment, and the like.

When organolead-containing compositions are utilized in internal combustion engines, other difficulties are frequently encountered. For example, in spite of the high degree of efficiency of the normal scavenger complement in antiknock fluids, the accumulation of engine deposits in the engine cannot be entirely prevented. Such deposition is particularly prevalent when spark ignition engines are operated under conditions of low speed and light load, such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems, including increased detonation, deposit-induced autoignition or wild ping, spark plug fouling, reduction in exhaust valve life, and the like.

Of the problems previously enumerated, those of wild ping, spark plug fouling, and reduced exhaust valve life are of considerable concern to the automotive industry. This results from the fact that each time the lead concentration in the fuel is raised to coincide with increases in compression ratio to eliminate detonation, the magnitude of one or more of these problems generally increases. As the result, there is a paramount need existing for a new and improved method for altering the physical and chemical characteristics of deposits and for modifying the combustion process such that the well-known detrimental effects of the previously described deposit-induced engine phenomena can be markedly suppressed or be eliminated.

It is, therefore, an object of this invention to provide adjuvants for organolead compounds. It is likewise an object of this invention to provide means of improving compositions such as antiknock fluids and fuels which contain organolead antiknock agents. Similarly, the provision of improved organolead compositions is another object of this invention. A particular object of this invention is to provide improved tetraethyllead-containing fuels, especially those for use in spark ignition type internal combustion engines. In addition, an object of this invention is to provide methods of improving antiknock fluids such that during compounding, storage, and blending operations such materials are stabilized against the adverse effects of deteriorative environments. An additional object of the instant invention is to provide means of obviating deposit-induced phenomena of the character described hereinbefore. Other important objects of this invention will be apparent from the discussion hereinafter.

It has now been found that the above and other objects of this invention are attained by providing compositions of matter adapted for use as additives to fuel for spark-fired internal combustion engines, comprising an organolead antiknock agent and, in quantity sufficient to stabilize or improve said agent, a metallic derivative of a product obtained by reaction between a phosphorus sulfide and an olefinic hydrocarbon, that is, an acyclic or cyclic hydrocarbon containing at least one carbon-to-carbon double bond. Such olefinic hydrocarbons are frequently referred to as olefins and cycloolefins.

It will be apparent that the organolead adjuvants of this invention are most readily prepared in two steps. The first consists of preparing a phosphorus sulfide-olefinic hydrocarbon reaction product. Depending upon the nature of the materials employed as well as the reaction conditions, the product of this reaction can be used in toto for the preparation of my metallic derivatives, or it can be subjected to intermediate treatment, as will become apparent from the discussion hereinafter. The phosphorus sulfide-olefinic hydrocarbon reaction product used in the formation of my organolead adjuvants can be made from a number of olefinic hydrocarbons. Thus, recourse can be made to such olefinic hydrocarbons as ethylene, propylene, the several butylenes, amylenes, hexylenes, octadecylenes, camphene, alpha and beta pinene, and the like, up to and including high molecular weight polybutenes and the like. Other materials which can be utilized in the preparation of the reaction products used to form my metallic derivatives or organolead adjuvants are hydrocarbons containing a plurality of double bonds which can be isolated, as in the case of diallyl, squalene, and terpene hydrocarbons in general; conjugated, for example, isoprene, dimethylbutadiene, and in general materials exemplified by the butadienes, hexadienes, and the like; and cumulative, as illustrated by the remarkably stable cumulenes. Cyclohexene, cyclooctane, cyclopentadiene, cyclohexadiene, pinene, camphene, fenchene, and similar compounds are illustrative of cyclic reactants which can be used to prepare the reaction products which are precursors of my metallic organolead adjuvants.

While the olefinic hydrocarbons described thus far generally represent single chemical entities, it is frequently preferred to utilize in the first step of the preparation of my organolead adjuvants mixtures of olefinic hydrocarbons, particularly mixtures which are readily available as articles of commerce. For example, suitable intermediate reaction products are obtained by reacting a phosphorus sulfide with a material such as obtained by the pyrogenic decomposition or cracking of higher molecular weight hydrocarbons such as paraffin wax, the dehydrogenation of alcohols, the dehydrohalogenation of halogenated paraffins, the polymerization of low molecular weight hydrocarbons, the averaging of hydrocarbons, the catalytic dehydrogenation of hydrocarbons, the reaction of carbon monoxide with hydrogen, and the like. For example, olefin polymers prepared by the polymerization of low molecular weight olefins prepared by methods known to the art, which possess molecular weights above about 100 but which preferably are in the range of about 100 to about 500, represent a type of olefinic hydrocarbon which can be successfully utilized in preparing my intermediate reaction products. One such material is Indopol L–50, which has an average molecular weight of about 420 and thus is, a polymer containing about 30 carbon atoms per molecule. This polymer is of the character obtained by polymerizing mixed butylenes by known methods. In some instances higher molecular weight polymers of this type, that is, polymers having molecular weights of about 3000 or higher, can likewise be used.

The phosphorus sulfide, the other prime reactant utilized in the preparation of the intermediates for the organolead adjuvants of this invention, is preferably a reactive compound such as phosphorus sulfide ($P_2S_5$), phosphorus heptasulfide ($P_4S_7$), or the like. It is possible, however, to use certain of the other reported phosphorus sulfides under the proper reaction conditions. Furthermore, an additional suitable phosphorus sulfide used for preparing my intermediates is thiophosphoryl chloride ($PSCl_3$). Likewise, under suitable conditions the various sulfides of arsenic or antimony can be similarly employed in forming intermediates for the preparation of the organolead adjuvants for use in accordance with the present invention.

The first step in the preparation of my metallic derivatives used as organolead adjuvants can be readily conducted. The reaction generally requires only the addition of a reactive phosphorus sulfide to the olefinic hydrocarbon and heating the mixture at a temperature at which the reaction takes place as evidenced by the release of hydrogen sulfide until the reaction is substantially complete. The temperature of the reaction is largely dependent upon the nature of the individual reactants, although, generally speaking, temperatures in the order of about 200° to about 450° F. are satisfactory. In preparing some of the intermediates for my metallic adjuvants, advantages are to be derived by conducting the first reaction under superatmospheric pressure, which can be readily obtained by conducting the reaction in a closed vessel, thereby taking advantage of the pressure resulting from the hydrogen sulfide so formed.

In forming the intermediate reaction products, from 0.2 to about 2.0 moles of the phosphorus sulfide are used per mole of an olefin hydrocarbon, although it is generally preferred to use from 0.25 to about 0.75 mole of the sulfide.

The intermediate reaction products used to form my metal-containing organolead adjuvants can be made in the presence of a diluent, if desired, which may or may not be subsequently removed. Such diluents are illustrated by such substances as kerosene, straight-run and catalytically cracked hydrocarbons of the diesel fuel boiling range, light, intermediate or heavy lubricating oil fractions, and the like.

The intermediate reaction products used in the preparation of my organolead adjuvants defy precise chemical definition. For example, in a recent publication (J. Am. Chem. Soc., 74, 4933 (1952)) disclosing the reaction between cyclohexene and $P_2S_5$ in a mole ratio of 4 to 1, it is stated that "attempts to isolate individual products formed were unsuccessful." Nevertheless, it is generally believed that such reaction products contain a substantial proportion of material containing phosphorus-to-sulfur bonds, particularly when low olefinic hydrocarbon-to-phosphorus ratios are employed. In other words, such materials presumably result by reaction between the active hydrogen alpha to the double bond and the phosphorus sulfide. Thus, it would appear that a considerable proportion of the intermediate reaction product consists of a thio acid anhydride material. It may well be that with certain pure starting materials and carefully controlled reaction conditions substantially pure reaction products are obtainable. However, an advantage inherent in the instant invention is the fact that it is not necessary to prepare substantially pure intermediate materials, and further, that it is generally preferred for economic reasons to utilize the reaction product in toto in the formation of my metallic derivatives.

Under some conditions the intermediate reaction product formed in accordance with the preceding discussion can be subjected to additional treatment before preparing my metallic compounds. One preferred treatment of this type is the utilization of centrifugation or filtration to remove any by-product sludge or other insoluble material which may be formed under some conditions. Excess volatile reactant or a volatile diluent, if used, can be removed by distillation. Likewise, if desired, the final by-product may be solvent-extracted with any suitable solvent, such as liquid propane or isopropanol, or contacted with an adsorbent, such as activated charcoal, silica gel, activated clay, or the like.

My organolead adjuvants, that is, the metallic derivatives of a product obtained by reaction between a phosphorus sulfide and an olefinic hydrocarbon, are formed by reacting the intermediate product with a metallic oxide, hydroxide, carbonate, or the like. It will be appreciated that any of a vast number of metals can be so utilized. However, generally speaking, it is preferable to form the alkali metal salts of the intermediate reaction products, that is, salts or soaps containing lithium, sodium, potassium, and the like. Similarly, another preferred class of metallic derivatives consists of the alkaline earth-containing compounds. In line with this, therefore, the intermediate reaction products can be treated with suitable oxides, hydroxides, or the like of such metals as magnesium, calcium, strontium, barium, or the like. However, any of the metallic elements, such as aluminum, arsenic, and other metals higher in the electromotive series, can be used in the preparation of my organolead adjuvants.

The amount of the metallic salt used to form my organolead adjuvants can be sufficient to neutralize all or part of the acidity of the intermediate reaction products. Generally such a reaction is carried out at an elevated temperature in the range of about 180° to about 350° F. in order to substantially complete the reaction. One skilled in the art will understand the nature of this neutralization step and further, the specific concentrations and reaction conditions which are used to form my efficacious adjuvants.

The second reaction step used in the formation of my adjuvants is frequently advantageously conducted in the presence of superatmospheric pressures. It will be appreciated that this situation obtains in the case of the formation of metallic derivatives of elements which form relatively weak bases, such as in the case of aluminum. On the other hand, in preparing derivatives of metals which form strong bases it is usually unnecessary to resort to the utilization of higher pressures.

While the preparation of the organolead adjuvants of this invention has been described in terms of a two-step process, recourse can be made to conducting this preparation in a single step. Thus, with many of the reactants employed in the manufacture of my adjuvants it is possible and indeed frequently preferred to mix the three prime constituents together in a reaction vessel and subject them to temperatures and pressures as above defined. Further modifications necessary in conducting such a combination process will be apparent to one skilled in the art.

Needless to say, the fact that the intermediate reaction products defy precise chemical definition renders it in praesenti impossible to state the chemical composition of my metallic organolead adjuvants. This will become apparent by consideration of the fact that both of the steps used in the formation of my metallic derivatives are obscured by a number of competing factors. On the one hand, the ratio of the reactants determines to some extent the character of my adjuvants. Furthermore, it is not inconceivable that the temperature at which the reaction is conducted will influence the amount and character of chemical cleavage which is undoubtedly inherent in such reactions. Likewise, it will be apparent that the specific materials employed will also have considerable bearing upon the nature of my metal-containing adjuvants. In summary, therefore, such factors as the operation of the law of mass action, reaction kinetics, steric factors, as well as consideration of the nature of the several reactants employed, highly obscure the fundamental reaction mechanism which apparently is involved.

When the metallic derivatives have been prepared, they can, as indicated hereinbefore, be utilized in toto in accomplishing the objects of this invention. However, under some conditions it is advantageous to resort to still additional treatment, such as filtration, centrifugation, solvent extraction, distillation, and the like so as to obtain particularly efficacious additives.

The organolead antiknock agent utilized in the compositions of matter of the present invention consists of an organolead compound in which lead is directly bonded to carbon atoms. Such compounds are exemplified by the lead aryls, such as tetraphenyllead, and the lead alkyls, such as tetramethyllead, tetraethyllead, tetrapropyllead, tetrabutyllead, dimethyldiethyllead, methyltriethyllead, and the like, as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the reaction product utilized in conjunction with an organolead compound is such that there is a total of from between about 0.01 to about 0.80 theory of phosphorus. In this regard, a theory of phosphorus is defined as the amount of phosphorus theoretically required to react with the lead to form lead orthophosphate, which quantity is two atoms of phosphorus per three atoms of lead. However, generally speaking, it is sufficient to employ an amount of an organolead adjuvant of this invention such that there is an amount of phosphorus between about 0.05 and about 0.5 theory, with the best over-all results usually being obtained with amounts of about 0.1 to about 0.2 theory of phosphorus, the last mentioned concentrations constituting a preferred embodiment.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combating such phenomena as spark plug fouling, wild ping, and the like. It is entirely probable that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a metallic derivative of a phosphorus sulfide-olefin hydrocarbon reaction product of the type described above. In such a case the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus and sulfur as above described and chemically bonded in accordance with the requirements of the metal salts of phosphorus sulfide-olefin hydrocarbon material used in this invention contributes sufficient scavenging action such that the amount and character of deposition in the engine are suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely, the utilization of my metal-containing adjuvants in organolead-containing antiknock fluids. It is well known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion, such antiknock fluids likewise may contain minor proportions of diluents, antioxidants, metal deactivators, and the like. In line with the foregoing, therefore, a preferred embodiment of this invention involves providing improved antiknock fluids containing the requisite concentration of a metallic derivative of a phosphorus sulfide-olefin hydrocarbon reaction product. Such improved antiknock fluids generally do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluid of the present invention utilized in my improved fuel compositions is primarily contingent upon the use for which the gasoline is intended. That is to say, when the fuel is intended for use in automotive engines such as passenger cars, trucks, buses, and the like, an amount of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent, such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines, somewhat higher concentrations are employed. Generally speaking, amounts of lead up to about 6.34 grams of lead per gallon can be utilized, although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of the compositions of the present invention the amount of phosphorus is fixed within the limits above described. Thus, in the preferred fuel embodiments of my invention there is present an amount of phosphorus as a metallic derivative of a phosphorus sulfide-olefin hydrocarbon reaction product such that there is from about 0.1 to 0.2 theory of phosphorus. In preparing the improved fuel compositions of this invention it is usually necessary only to add the requisite quantity of the improved fluid to the fuel, and by means of stirring, shaking, or other means of physical agitation, homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of a metal salt of a phosphorus sulfide-olefin hydrocarbon material. In addition to reversing this order of addition of conventional antiknock fluids and my metal-containing adjuvants, another variant within the purview of this invention is to blend with the fuel each of the individual constituents of my antiknock fluids separately.

The following specific examples wherein all parts and percentages are by weight are illustrative of the methods which can be employed in preparing the organolead adjuvants of this invention.

*Example I*

To an all glass reaction vessel equipped with a stirrer and a reflux condenser was added 3020 parts of a polybutene having an average molecular weight of about 420. To this olefinic hydrocarbon was then added 666 parts of $P_2S_5$. The reaction mixture was then heated for a period of 4 hours at a temperature of 200° C. while continuously agitating the reactants. Upon completion of the reaction the mixture was subjected to filtration while hot so as to remove minor amounts of solid products which had formed.

The above example demonstrates the method for the preparation of the reaction intermediate used in the formation of my organolead adjuvants as shown in the following examples.

*Example II*

To an all glass reaction vessel was added 201.5 parts of the intermediate reaction product as prepared in accordance with the preceding specific example. To this substance was added 53 parts of the monohydrate of lithium hydroxide ($LiOH \cdot H_2O$), 248 parts of water and 588.5 parts of SAE-20, 30 V. I. motor oil as a diluent. The entire reaction mixture was then heated while stirring to a temperature of 80° C. for a period of 2 hours. At the end of this period the temperature was increased to 125° C. and blown with air for 2 more hours. When this treatment was completed the product was diluted with an equal volume of toluene, centrifuged and filtered. Analysis of the final adjuvant revealed 3.5 percent of sulfur, 1.0 percent of lithium and 2.12 percent of phosphorous.

*Example III*

Utilizing the procedure as disclosed in the previous example, a strontium adjuvant of this invention was prepared using 201.5 parts of the intermediate reaction product as formed in Example I, 112 parts of the octahydrate of strontium hydroxide ($Sr(OH)_2 \cdot 8H_2O$), and 600 parts of kerosene. Upon completing the thermal and air blowing steps the product was filtered while hot, thereby removing minor amounts of impurities formed.

The reactants and reaction conditions described in the previous specific examples are merely illustrative. For example, by utilizing the above and similar reaction conditions it is possible to prepare suitable adjuvants of this invention by reacting a phosphorus sulfide such as $P_2S_5$, $P_4S_7$ and the like with such organic reactants as amylenes, polybutenes, etc. and then forming the lithium, sodium, magnesium and related metal salts.

As previously indicated my metallic adjuvants afford protection to conventional antiknock fluids when present therein in minor proportions. The following specific example more fully illustrates the highly beneficial, important and unexpected properties of the adjuvants of this invention in possessing the requisite degree of solubility in antiknock fluids and likewise affording thereto such a considerable degree of stabilization.

*Example IV*

A sample of 10 parts by volume of a conventional antiknock fluid consisting essentially of tetraethyllead and 1.0 theory of bromine as ethylene dibromide was placed in a clear high transmittency glass container. To an identical quantity of the same antiknock fluid was added 0.5 part by volume of the lithium derivative of the product obtained by reaction between $P_2S_5$ and a 420 molecular weight polybutene. Upon mechanically agitating this sample a homogeneous clear antiknock fluid of this invention was prepared. Another of my fluids was prepared in the same manner with the exception that it contained 1.0 part by volume of the same organolead adjuvant. These samples, referred to in the following table as fluids A, B and C, respectively, were then subjected to the deteriorative action of strong sunlight, while periodically observing the degree of physical and chemical change which occurred. The results of these tests are shown in the following table.

TABLE

| Additive | Time Required for Initial Turbidity, Min. | Turbidity | | | | | |
|---|---|---|---|---|---|---|---|
| | | 5 Min. | 10 Min. | 15 Min. | 30 Min. | 1 Hr. | 2 Hr. |
| Fluid A | 3 | Med | Hvy | Med. Sludge, Yellow. | Hvy. Sl., Yellow. | | |
| Fluid B | 90 | Clear | Clear | Clear | Clear | Clear | V. Sl., Deep Amber. |
| Fluid C | 195 | Clear | Clear | Clear | Clear | Clear | Clear. |

To further illustrate the effectiveness of the improved antiknock fluids of the present invention, consideration can be given to the problem of spark plug fouling. In order to do this, recourse can be made to the following general test procedure utilizing a standard modern V-8 engine equipped with overhead valves having a 3¾" bore, a 3 7/16" stroke, a 303.7 cubic inch displacement, and a compression ratio of 7.25 to one equipped with commercially available spark plugs. In order to establish a base line, this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. This is operated under a durability schedule used for spark plug deposit accumulation patterned after rod conditions experienced in city driving which are known to produce spark plug fouling of the greatest magnitude. Such operation is substantially continuous until a number of spark plug failures is detected, thereby establishing a quantitative measure of the degree of spark plug fouling which can be expressed in average hours to plug failure. The engine is then freed from deposits and equipped with new spark plugs. The same procedure is repeated using the same fuel base stock to which is added an improved antiknock fluid of the present invention.

By way of example, when 300 gallons of a petroleum hydrocarbon fuel available as an article of commerce is treated with 900 milliliters of tetraethyllead in a fluid containing tetraethyllead, 0.5 theory of bromine as ethylene dibromide and 1.0 theory of chlorine as ethylene dichloride, a suitable fuel is prepared for establishing a base line of hours to spark plug failure. When the standard V-8 engine described hereinbefore is then operated on this homogeneous fuel composition, it is found that in an average time of about 34 hours 3 spark plug failures have occurred.

In contrast, when a suitable quantity of the same fuel base stock is treated with an improved antiknock fluid of the present invention, greatly enhanced spark plug life is obtained. For example, when 1000 gallons of the same fuel base stock is treated with 3 liters of tetraethyllead as a fuel comprising 0.5 theory of bromine as ethylene dibromide, 1.0 theory of chlorine as ethylene dichloride, and 0.2 theory of phosphorus as the strontium derivative of the P₂S₅-polybutene reaction product, an improved fuel of the present invention results. Upon intimately mixing the aforementioned components the homogeneous fuel composition containing 3.0 milliliters of tetraethyllead per gallon is suitable for use in the above described engine test procedure. It is found that a substantial improvement in spark plug performance as evidenced by the greater period of continuous engine operation results from the utilization of such an improved fuel of the present invention. That is to say, the average hours to three spark plug failures is substantially in excess of the base line figure of 34 hours.

When such adjuvants as the lithium salt of the reaction product formed between P₂S₅ and a 600 molecular weight polypropylene, the calcium salt of the reaction product formed from P₄S₇ and a 1000 molecular weight polymer formed by polymerizing C₃ and C₄ hydrocarbons, the barium salt of the P₄S₁₀ reaction product with olefins from cracked wax and the like are utilized in accordance with the present invention, comparable effectiveness regarding minimization of spark plug fouling is obtained. Without desiring to be bound by the following explanation regarding the enhanced effectiveness of the adjuvants of this invention, a tenable explanation apparently involves a proper balance between physical properties, such as stability, volatility, solubility, compatibility, and the like, and the energy relationships or ease of decomposition which may attribute to the over-all effectiveness of my adjuvants by facilitating decomposition at the proper instant in the engine cycle.

To still further illustrate the enhanced effectiveness of the organolead-containing compositions of the present invention, consideration was given to the problem of wild ping. To demonstrate the effectiveness of my compositions in this regard, I subjected both a hydrocarbon fuel treated in accordance with this invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which have occurred during the test periods. Such apparatus included an extra spark plug used as an ionization gap which was installed in a second opening in the combustion chamber. A mechanical breaker switch driven at camshaft speed was also provided which, when closed, made the wild ping counter ineffective for the duration of the normal flame in the combustion chamber. The breaker was open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center), the flame front reaches the ionization gap at 15 to 18° ATC during the period wherein the points were closed and no count was made. The actual test procedure consisted essentially of operating the test engine initially having a clean combustion chamber under relatively mild cycling conditions for deposit formation until an equilibrium with regard to deposit-induced autoignition was reached. The effect of fuel treated in accordance with the instant invention is determined by comparing the test results obtained using the fuel treated with a metal derivative of an olefin-phosphorus sulfide reaction product with those obtained using a fuel treated with a conventional antiknock mixture. Since the wild ping counter records the total number of wild pings which occurred during the test procedures, a quantitative expression for the amount of deposit-induced autoignition is the number of wild pings per hour of operation. The effectiveness of my improved fuel composition in virtually eliminating deposit-induced autoignition will be apparent from the following specific examples.

*Example V*

To 100 gallons of a commercially available blend of straight-run, catalytically cracked, and polymer blending stocks was added and thoroughly mixed 300 milliliters of tetraethyllead as an antiknock fluid comprising tetraethyllead, 0.5 theory of bromine as ethylene dibromide, and 1.0 theory of chlorine as ethylene dichloride. The resulting homogeneous fuel composition was then utilized as the fuel in the previously designated single-cylinder laboratory test engine to formulate a base line of wild ping. It was found that there were 140 wild pings per hour of engine operation.

Example VI

An improved antiknock fluid composition of the present invention was prepared by adding 0.1 theory of phosphorus as the lithium salt of the product obtained by reaction between $P_2S_5$ and a 420 molecular weight polybutene to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components. The entire quantity of improved antiknock fluid composition so prepared was added to 50 gallons of a commercially available blend of straight-run, catalytically cracked, and polymer blending stocks. Upon mechanically agitating the resulting mixture a homogeneous fuel composition was prepared. The laboratory single-cylinder test engine as described previously was then operated on this improved fuel composition while contemporaneously determining the rate of wild pings as detected by the wild ping counter. It was found that the utilization of an improved antiknock fuel of the present invention resulted in 49 wild pings per hour as contrasted with a conventional fuel which produced 140 per hour. Consequently, an improved fuel composition of this invention, when introduced into an internal combustion engine, resulted in a reduction in this deposit-induced engine phenomenon amounting to 65 percent.

The test results obtained as described in the previous example showed another startling benefit to be obtained by practicing the instant invention. Visual inspection of the intake valve indicated that its under-surface in the vicinity of the throat area was entirely free from any gums or other tacky organic residues. It is apparent, therefore, that the adjuvants of this invention are capable of acting in a dual capacity. That is to say, it is apparent that my adjuvants are capable of maintaining the induction system of an internal combustion engine comprising the inlet manifold, valve chamber and valves in an extremely clean condition. A visual inspection of the corresponding valve of the same test engine operated on a conventional fuel showed the presence of a preponderate amount of varnish and hard carbonaceous deposits and the like, which further serves to point out the novelty of my invention.

Example VII

An improved antiknock fluid composition of the present invention was prepared by adding 0.1 theory of phosphorus as the barium salt of the product obtained by reaction between $P_2S_5$ and 420 molecular weight polybutene to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components. The entire quantity of improved antiknock fluid composition so prepared was added to 50 gallons of a commercially available blend of straight-run, catalytically cracked, and polymer blending stocks. Upon mechanically agitating the resulting mixture a homogeneous fuel composition was prepared. The laboratory single-cylinder test engine as described previously was then operated on this improved fuel composition while contemporaneously determining the rate of wild pings as detected by the wild ping counter. It was found that the utilization of an improved antiknock fuel of the present invention resulted in 80 wild pings per hour as contrasted with a conventional fuel which produced 140 per hour. Consequently, an improved fuel composition of this invention, when introduced into an internal combustion engine, resulted in a reduction in this deposit-induced engine phenomenon amounting to 43 percent.

Example VIII

An improved antiknock fluid composition of the present invention was prepared by adding 0.2 theory of phosphorus as the lithium salt of the product obtained by reaction between $P_2S_5$ and 420 molecular weight polybutene to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components. The entire quantity of improved antiknock fluid composition so prepared was added to 50 gallons of a commercially available blend of straight-run, catalytically cracked, and polymer blending stocks. Upon mechanically agitating the resulting mixture a homogeneous fuel composition was prepared. The laboratory single-cylinder test engine as described previously was then operated on this improved fuel composition while contemporaneously determining the rate of wild pings as detected by the weld ping counter. It was found that the utilization of an improved antiknock fuel of the present invention resulted in 45 wild pings per hour as contrasted with a conventional fuel which produced 170 per hour. Consequently, an improved fuel composition of this invention, when introduced into an internal combustion engine, resulted in a reduction in this deposit-induced engine phenomenon amounting to 74 percent.

The foregoing specific examples are merely illustrative of the beneficial effects produced by the improved organolead-containing compositions of the present invention. It will be apparent that it is preferred to utilize the adjuvants of this invention such as the potassium salt of $P_2S_5$ reaction product formed from a 3000 molecular weight polybutene, the mixed calcium and barium salt of a reaction product made by reacting the $P_2S_5$ with a mixture of degras (wool fat) and an approximately 10,000 molecular weight polybutene and the like, in high octane quality fuel because of the fact that most of the deposit-induced problems exist on combustion of such fuels.

The superior effectiveness of the preferred embodiments of this invention, namely, a metallic derivative of a phosphorus sulfide-olefin hydrocarbon reaction product, in the diminution of deposit-induced engine problems is further unexpected when considering the prime constituents phosphorus and sulfur which are contained therein. On the one hand, both sulfur and phosphorus compounds have heretofore been judiciously avoided as much as possible in fuel because of their notorious deleterious effects, particularly in the realm of organolead antagonism and the like. In the case of sulfur, for example, refiners have long been resorting to various means of removing sulfur compounds from hydrocarbons of the gasoline boiling range because of their recognized deleterious effects on antiknock activity, engine cleanliness, storage stability, and the like. However, the adjuvants of this invention possessing considerable proportions of phosphorus and sulfur do not bring about such deleterious effects. Furthermore, another surprising effect has been noted, namely, the fact that the presence of phosphorus-to-sulfur bonds produces a greater effectiveness regarding wild ping than that exhibited by compounds possessing either phosphorus or sulfur and, likewise, a mixture of phosphorus- and sulfur-containing compounds. This fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of 1 theory of di-t-butyl disulfide, 2 theories of dibutyl sulfide, and 2 theories of thiophene, a mixture representative of the average sulfur constituents of petroleum hydrocarbon fuel, to a conventional gasoline containing 3 milliliters of tetraethyllead per gallon resulted in a wild ping rate of 93 wild pings per hour. In contrast, the same fuel containing the same concentration of tetraethyllead produced 74 wild pings per hour. Thus, the incorporation of sulfur-containing compounds different from the sulfur-containing adjuvants utilized in this invention resulted in a wild ping rate amounting to 125 percent of the base line. That is to say, the presence of sulfur-containing compounds generally increases the rate of wild ping whereas the presence of a considerable amount of sulfur, when suitably bonded in accordance with the present invention, results in a definite improvement in this deposit-induced phenomenon. In view of the foregoing, therefore, the apparent conclusion to be reached is that the chemical bonds between the two prime elements making up my adjuvants in some currently unexplainable manner produce enhanced effectiveness with regard to deposit-induced engine phenomena without resulting in secondary deleterious problems normally attributed to the presence of each of the elements when used separately or as mixtures of individual phosphorus- and sulfur-containing compounds.

As indicated, an additional important advantage obtained from practicing this invention is the fact that my adjuvants have little or no antagonistic effect upon the antiknock agent used in the fuel. In line with the enhanced effectiveness of my organolead adjuvants this surprising benefit regarding a minimum of organolead destructiveness is perhaps associated with the degree of oxidative stability inherent in a metal salt of a phosphorus sulfide-olefin hydrocarbon material. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

Because of their adaptability the adjuvants of the present invention can be successfully utilized with any of the well-known organolead antiknock agents as indicated hereinbefore. Likewise, insofar as the halide scavengers are concerned, the metallic derivative of a phosphorus sulfide-olefin hydrocarbon reaction product used in this invention can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,497,902; 2,497,903; and 2,496,983. Likewise, the adjuvants of this invention can be used in conjunction with other well-known motor fuel adjuvants such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock additive for use in hydrocarbon fuels of the gasoline boiling range, said additive comprising an organolead antiknock agent and a metallic derivative of a product obtained by reaction between (1) a phosphorus sulfide selected from the group consisting of $P_2S_5$ and $P_4S_7$ and (2) an olefinic hydrocarbon having a molecular weight from about 100 to about 3000, said product being prepared by heating from about 0.2 to about 2.0 moles of said phosphorus sulfide per mole of said olefinic hydrocarbon to a temperature at which hydrogen sulfide is released, said metallic derivative being prepared by reacting said product at a temperature in the range of about 180 to 350° F. with an amount of a metallic base selected from the group consisting of oxides, hydroxides, and carbonates sufficient to neutralize at least a part of the acidity of said product; said metallic derivative being present in said additive in amount such that the phosphorus-to-lead atom ratio is from about 0.02/3 to about 1.6/3.

2. The additive of claim 1 further characterized in that the antiknock agent is a lead alkyl.

3. The additive of claim 1 further characterized in that the antiknock agent is tetraethyl lead.

4. An antiknock additive for use in hydrocarbon fuels of the gasoline boiling range, said additive consisting essentially of tetraethyllead, a scavenging amount of organic halide material capable of reacting with the lead during combustion in a spark ignition internal combustion engine to form volatile lead halide, said material containing only elements selected from the group consisting of bromine, chlorine, carbon, hydrogen, and oxygen; and a metallic derivative of a product obtained by reaction between (1) a phosphorus sulfide selected from the group consisting of $P_2S_5$ and $P_4S_7$ and (2) an olefin hydrocarbon polymer having a molecular weight from about 100 to about 500, said product being prepared by heating from about 0.2 to about 2.0 moles of said phosphorus sulfide per mole of said olefinic hydrocarbon to a temperature at which hydrogen sulfide is released, said metallic derivative being prepared by reacting said product at a temperature in the range of about 180 to 350° F. with an amount of a metallic base selected from the group consisting of oxides, hydroxides, and carbonates sufficient to neutralize at least a part of the acidity of said product; said metallic derivative being present in said additive in amount such that the phosphorus-to-lead atom ratio is from about 0.02/3 to about 1.6/3.

5. The additive of claim 4 further characterized in that said scavenging amount of organic halide material is about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

6. The additive of claim 4 wherein said metallic derivative is the lithium derivative of the product prepared from $P_2S_5$ and a polybutene having an average molecular weight of about 420.

7. Hydrocarbon fuel of the gasoline boiling range adapted for use as fuel for spark ignition internal combustion engines containing from about 0.53 to about 6.34 grams of lead per gallon as an organolead antiknock agent, and a metallic derivative of a product obtained by reaction between (1) a phosphorus sulfide selected from the group consisting of $P_2S_5$ and $P_4S_7$ and (2) an olefinic hydrocarbon having a molecular weight from about 100 to about 3000, said product being prepared by heating from about 0.2 to about 2.0 moles of said phosphorus sulfide per mole of said olefinic hydrocarbon to a temperature at which hydrogen sulfide is released, said metallic derivative being prepared by reacting said product at a temperature in the range of about 180 to 350° F. with an amount of a metallic base selected from the group consisting of oxides, hydroxides, and carbonates sufficient to neutralize at least a part of the acidity of said product; said metallic derivative being present in said fuel in amount such that the phosphorus-to-lead atom ratio is from about 0.2/3 to about 1.6/3.

8. The hydrocarbon fuel composition of claim 7 further characterized in that it contains a scavenging amount of organic halide material capable of reacting with the lead during combustion in a spark ignition internal combustion engine to form volatile lead halide, said material containing only elements selected from the group consisting of bromine, chlorine, carbon, hydrogen, and oxygen.

9. Hydrocarbon fuel of the gasoline boiling range adapted for use as fuel for spark ignition internal combustion engines containing from about 0.53 to about 4.75 grams of lead per gallon as tetraethyllead, about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride; and a metallic derivative of a product obtained by reaction between (1) a phosphorus sulfide selected from the group consisting of $P_2S_5$ and $P_4S_7$ and (2) an olefin hydrocarbon polymer having a molecular weight from about 100 to 500, said product being prepared by heating from about 0.2 to about 2.0 moles of said phosphorus sulfide per mole of said olefinic hydrocarbon to a temperature at which hydrogen sulfide is released, said metallic derivative being prepared by reacting said product at a temperature in the range of about 180 to 350° F. with an amount of a metallic base selected from the group consisting of oxides, hydroxides, and carbonates sufficient to neutralize at least a part of the acidity of said product; said metallic derivative being present in said fuel in amount such that the phosphorus-to-lead atom ratio is from about 0.2/3 to about 1.6/3.

10. The composition of claim 9 wherein the metal of said metallic derivative is selected from the group consisting of alkali and alkaline earth metals.

11. The composition of claim 9 wherein said metallic derivative is the lithium derivative of the product prepared from $P_2S_5$ and a polybutene having an average molecular weight of about 420.

12. The composition of claim 9 wherein said metallic derivative is the barium derivative of the product prepared from $P_2S_5$ and a polybutene having an average molecular weight of about 420.

References Cited in the file of this patent

UNITED STATES PATENTS

| | | |
|---|---|---|
| 2,378,793 | Rudel | June 19, 1945 |
| 2,398,281 | Bartholomew | Apr. 9, 1946 |
| 2,405,560 | Campbell | Aug. 13, 1946 |
| 2,439,819 | Mussellman | Apr. 20, 1948 |
| 2,439,820 | Mussellman | Apr. 20, 1948 |
| 2,534,217 | Bartleson | Dec. 19, 1950 |
| 2,712,528 | Hill et al. | July 5, 1955 |

FOREIGN PATENTS

| | | |
|---|---|---|
| 683,405 | Great Britain | Nov. 26, 1952 |